United States Patent [19]

Pillar et al.

[11] 3,819,544

[45] June 25, 1974

[54] FOAMED PARTICLES FOR LOOSE FILL PACKAGING

[75] Inventors: Walter O. Pillar, Monroeville; Timothy Altares, Jr., Valencia, both of Pa.

[73] Assignee: Arco Polymers, Inc., Pittsburgh, Pa.

[22] Filed: Feb. 23, 1973

[21] Appl. No.: 335,044

[52] U.S. Cl. ... 260/2.5 B, 260/2.5 FP, 260/DIG. 24
[51] Int. Cl. .............................................. C08j 1/26
[58] Field of Search ................................. 260/2.5 B

[56] References Cited
UNITED STATES PATENTS

| | | | |
|---|---|---|---|
| 3,058,926 | 10/1962 | Eichhorn | 260/2.5 B |
| 3,222,343 | 12/1965 | Ingram et al. | 260/2.5 B |
| 3,265,642 | 8/1966 | Hatano et al. | 260/2.5 B |

*Primary Examiner*—Murray Tillman
*Assistant Examiner*—Morton Foelak
*Attorney, Agent, or Firm*—Dr. Lewis J. Young

[57] ABSTRACT

Foamed, self-extinguishing particles of styrene polymers and copolymers are prepared by subjecting hot-cut pellets having little or no internal stresses to a two-stage process comprising a pellet flattening stage and a self-extinguishing agent stage. The resulting flat disks can be expanded by steam to form flat, self-extinguishing particles having a mixture of shapes ranging from circular to oval and having a flatness index of between 2.0 and 9.0. The particles are especially suitable for use in the loose-fill packaging of sensitive or fragile articles.

5 Claims, 7 Drawing Figures

FOAMED PARTICLES FOR LOOSE FILL PACKAGING

BACKGROUND OF THE INVENTION

This invention relates generally to the preparation of foamed thermoplastic polymer particles having a distinctive shape suitable as loose-fill packaging material.

It is known from U.S. Pat. No. 3,188,264, to extrude foamable thermoplastic beads into rods having irregular cross-sectional configurations and cut off various lengths to form particles having a shape capable of interlocking and suitable for loose-fill packaging materials. RE 27,243, relates to the extrusion of cylindrical foamed rods which, when cut to short lengths and caused to warp by heat, form various shapes also suitable for loose-fill packing.

These methods both involve the use of relatively expensive extrusion equipment to obtain the foamed shapes.

SUMMARY OF THE INVENTION

It has now been found that foamed thermoplastic polymer particles suitable for use as loose-fill packaging material can be prepared without the need for expensive extrusion equipment during the foaming process. Thus, commercially available hot-cut polymer pellets are suspended in aqueous medium, heated at 120°–130° C. in the presence of an organic blowing agent to impregnate the pellets while simultaneously reshaping the pellets into flat, disk-shaped disks, further impregnated at 75°–85° C. with additional blowing agent and a self-extinguishing agent, separated from the water, and expanded by the use of heat to form distinctively shaped, foamed particles having a density of about 1.5 pound per cubic foot or less.

DETAILED DESCRIPTION OF THE INVENTION

In accordance with this invention, a variety of expandable thermoplastic homopolymers and copolymers can be prepared which are derived from vinyl aromatic monomers including styrene, vinyl-toluene, isopropylstyrene, p-tertbutylstyrene, alpha-methylstyrene, nuclear methylstyrene, chlorostyrene, etc., as well as copolymers of these with monomers such as butadiene, alkyl methacrylates, alkyl acrylates, and acrylonitrile wherein the vinyl aromatic monomer is present in at least 50% by weight. For the purposes of convenience, these polymers are referred to herein as styrene polymers. The styrene polymers can, of course, be prepared by any of the conventional polymerization techniques.

The styrene polymer pellets suitable for the process of the invention are preferably those formed by the hot cutting under water of styrene polymers extruded directly into the water. The hot-cutting process is a well-known, commercially available process which is distinguished from the normal pelletization process involving extrusion of a strand of polymer which is then cooled by drawing the strand through a water bath and subsequently cutting or chopping of the strand to the desired length. The latter process, commonly referred to as the cold-cut process, leads to a pellet having generally cylindrical shape and having internal longitudinal stresses frozen into the pellet.

By contrast, the hot-cut pelletization process involves extruding the hot polymer strand directly into a water bath and cutting the strand under water, at the face of the extruder die. The resulting polymer particle then tends to shrink to an irregular, generally spherical shaped granule, or pellet, having little or no internal stress in the pellet. One such commercially available product is the Dylene C8 polystyrene pellet available from Sinclair-Koppers Company.

The impregnation of the pellets is accomplished in two distinct stages, the pellet flattening stage and the self-extinguishing agent stage.

Figure 2:
FIG. 2 is a plan and top view of one of the flat, circular disks produced by the process of the invention.
Figure 3:
FIG. 3 is a plan and top view of one of the flat, elliptical disks produced by the process of the invention.
Figure 4:
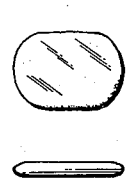
FIG. 4 is a plan and top view of one of the flat, oval disks produced by the process of the invention.

In the pellet flattening stage, the hot cut pellets are suspended in water to which has been added the suspending agents and the blowing agents. The suspension is then heated to a temperature of between 120° and 130° C. for 3 to 10 hours to impregnate the pellets while reforming the pellets into flat disks having a mixture of circular, elliptical and oval shapes as shown in FIGS. 2–4 of the drawing.

The ratio of water to pellets used in the flattening stage is generally between 2:1 and 1:1. The lower ratios are preferred both because of the economy of the process and because greater flattening of the pellets occurs at these ratios.

Suitable suspending agents, used to prevent the pellets from agglomerating at the elevated temperatures employed during the pellet flattening impregnation, are those inorganic suspending agents described in D'Alelio, U.S. Pat. No. 2,983,692, such as tricalcium phosphate in combination with an anionic surfactant. The preferred system is a mixture of tricalcium phosphate, sodium dodecylbenzenesulfonate, and lime.

The concentration of the tricalcium phosphate should be between 0.5 and 2.0 parts per 100 parts of polymer pellets. Less than 0.5 parts of the phosphate allows the suspended pellets to agglomerate and greater than 2.0 parts prevents the flattening of the pellets.

The sodium dodecylbenzenesulfonate may be between 0.01 and 0.1 parts per 100 parts of polymer pellets depending on the amount of phosphate present. Amounts between 0.03 and 0.06 are preferred to obtain the desired degree of flattening of the pellets.

The concentration of lime used should be generally between 0.2 and 0.4 parts per 100 parts of polymer pellets. The lime appears to have very little effect on the pellet flattening process, but may be needed to prevent agglomeration of the suspended pellets during the later impregnation with the self-extinguishing agents.

The blowing agents are compounds which are normally liquid but will produce gases on heating. Suitable blowing agents include aliphatic hydrocarbons containing from 1–7 carbon atoms in the molecule, for example, petroleum ether or methane, ethane, propane, butane, pentane, hexane, heptane, cyclohexane, isopentane and their halogenated derivatives which boil at a temperature below the softening point of the polymer. The agents are normally used in amounts between 5 and 20 percent by weight of the polymer particles. For the pellet flattening stage, the preferred agent is a mixture of 45 parts of n-pentane and 55 parts of trichlorofluoromethane (Freon 11). In the use of this mixture, the best results are obtained when all of the pentane and about half of the trichlorofluoromethane are added during the flattening stage and the remainder of the halomethane added during the later impregnation with the self-extinguishing agent.

Figure 1:
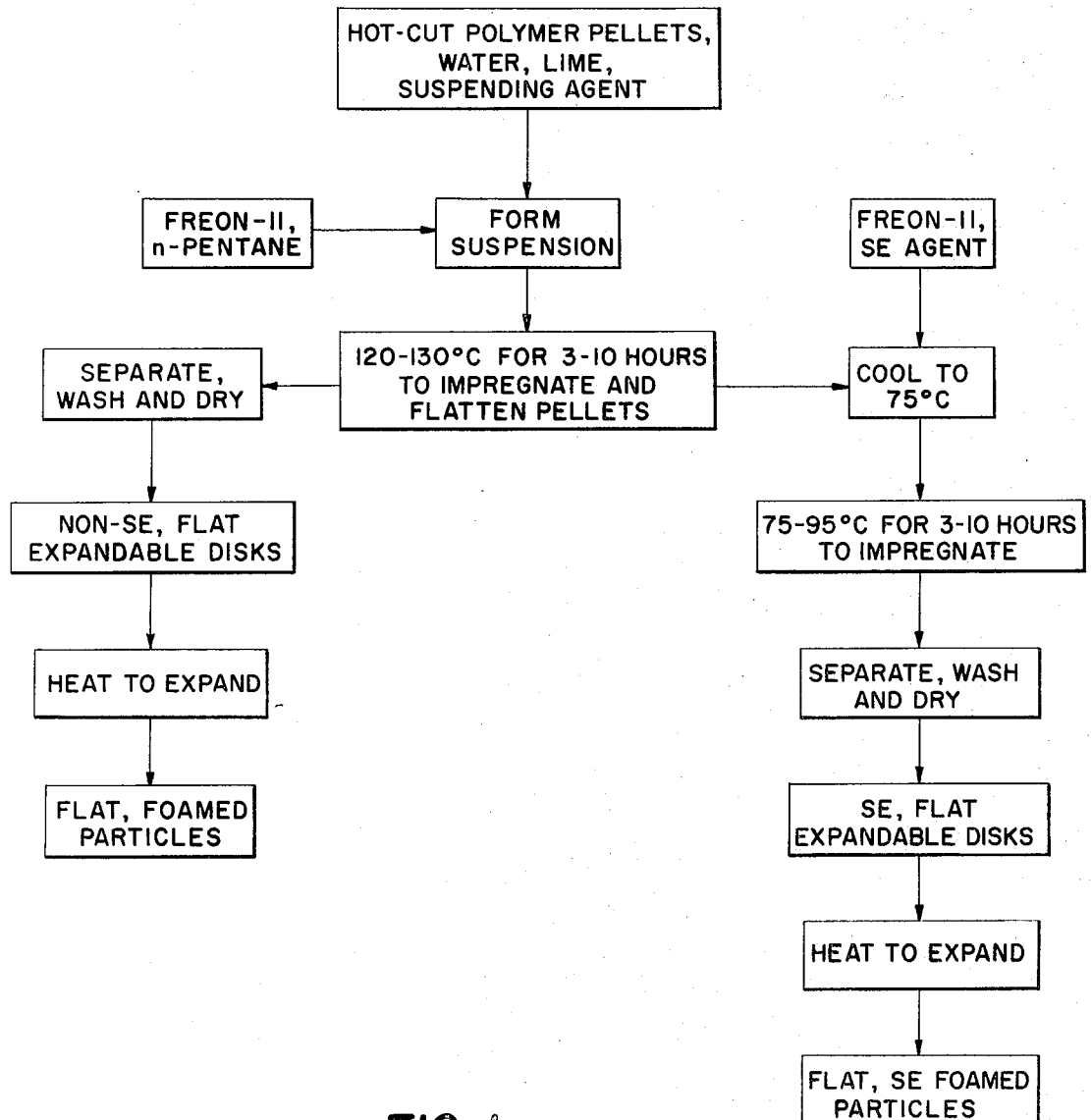
FIG. 1 is a flow diagram illustrating a typical embodiment of the process of the invention.

As shown schematically in the left side of FIG. 1, the impregnated, flattened pellets may be separated from the aqueous suspension, washed and dried to give the mixture of flat, vari-shaped disks which may be expanded to flat, foamed particles which are not self-extinguishing.

It is generally preferable that the foamed particles for loose-fill packaging be self-extinguishing to provide safer packaging. To accomplish this feature one or more fire-retardant additives may be added to the suspension of flattened polymer pellets and these additives will be impregnated along with the remainder of the blowing agent.

The fire-retardant agent may be any of the known agents such as the halogenated phosphates of U.S. Pat. No. 3,001,954, the mixtures of organic halogen compounds with peroxides of U.S. Pat. Nos. 3,058,926; 3,058,927; 3,058,928; and 3,058,929, or the tetrabromobicyclononane of U.S. Pat. No. 3,511,796. The agent is normally used in amounts from 1 to 20 percent by weight. The lesser amounts of self-extinguishing agent may be used if a peroxide synergist is used simultaneously.

The self-extinguishing agent is added in the second stage of the impregnation. In this stage, the suspension of flattened pellets from the first stage is cooled to about 75° C. and additional Freon is added along with the self-extinguishing agent. The suspension is then heated to a temperature of between 75° C. and 95° C. for an additional 3 to 10 hours to impregnate the flattened pellets without changing their shape. The self-extinguishing, expandable disks are receovered from the suspension by centrifugation, washed with water, and dried. The product disks are all extremely flat and are a mixture of shapes varying from circular (see FIG. 2) to elliptical (see FIG. 3) to oval (see FIG. 4). The thickness of the flat disks is about 1/16-inch and the flatness index is between 2.0 and 6.0.

The flatness index of the impregnated disks is defined as the ratio of the average diameter to the thickness of the disk. The average diameter is determined as the average of the shortest and longest dimensions on elongated disks.

Expansion of the flat, expandable disks to the final loose-packaging shape is accomplished by heating the disks in equipment designed for the pre-expansion of foamable polymers. Such equipment may be, for example, pre-expanders as described in Rodman, U.S. Pat. No. 3,023,175, in Adams et al., U.S. Pat. No. 3,494,988, or in Mills et al, U.S. Pat. No. 3,671,026.

Heating in the pre-expander is normally accomplished by means of steam, although other means, such as radiant heat or burners below the expander are also effective. Expansion is usually carried out at temperatures between about 80° and 120° C. The desired temperature is normally above the boiling point of the blowing agent and at or slightly above the softening point of polymer. If the temperature is too low, the expansion is incomplete. Too high a temperature causes the expanded particles to collapse and shrivel.

The disks are generally subjected to a first expansion period of from 2–3 minutes which gives expanded particles having a density of about 1.5 pounds per cubic foot or less. After aging for 6 to 24 hours, the particles may be re-exposed to steam in a second expansion step which reduces their density to between 0.4 and 0.7 pound per cubic foot.

Figure 5:
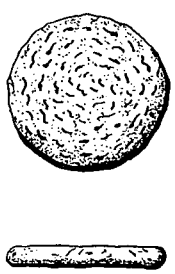
FIGS. 5, 6, and 7 are plan and top views of the expanded particles produced by heating the disks of FIGS. 2, 3, and 4, respectively.
Figure 6:
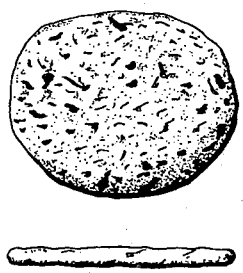
Figure 7:
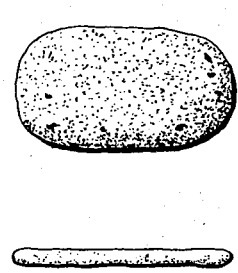

The resulting foamed polymer particles are a mixture of flat particles having essentially the same shapes as the flat, impregnated disks. The particles are illustrated in FIGS. 5, 6 and 7 of the drawings. The foamed particles are free-flowing and self-extinguishing as measured by the test methods described below. The particles have a thickness of about ⅛ to 3/16-inch and a flatness index varying from 2.0 to 9.0 within any one mixture. Because of their extreme flatness, the foamed particles are especially useful as loose-fill packaging material which can be intimately packed together without being crushed or broken.

The flowability and self-extinguishing characteristics of the expanded particles were measured by test methods outlined in General Service Administration's Purchase Description "FSN-8135-935-0983-Cushioning Material."

The test for flowability consists in filling a standard funnel with a measured amount of the material to be tested, and recording the time required for the material to flow from the funnel. The funnel must have a capacity of 3 cubic feet with a 6-inch inside diameter extension tube and a slope of 45° on the funnel wall. Material which empties from the funnel in 30 seconds or less is considered to be free-flowing and acceptable in the test.

The test for self-extinguishing characteristics of the expanded particles consists in filling a standard size wire basket with the particles, placing a burning tablet (Methenamine reagent tablets number 1588 from Eli Lilly and Company) on the material in the basket, and recording the time elapsed when the flame is extinguished or until the tablet has burned its way to the bottom of the basket and is burning by itself with no evidence of flame in the cushioning material or its melted residue. The basket shall be 4 inches by 4 inches square by 6 inches deep and made of ¼-inch wire mesh. Materials having a lapsed time of 41 seconds or less are considered self-extinguishing by this test.

The invention is further illustrated by the flow diagram of FIG. 1 of the drawing and by the following examples wherein parts are parts by weight unless otherwise indicated.

Example I

To a kettle equipped with a stirrer was added 125 parts of water, 1.25 parts of tricalcium phosphate as dispersing agent, 0.05 part of sodium dodecylbenzene sulfonate as anionic surfactant, 0.3 part of lime as suspension stabilizer, and 100 parts of polystyrene pellets (sold by Sinclair-Koppers Company under the trademark Dylene C8, number 10 hot-cut having a pellet size of about ⅛ to ¼-inch diameter). The mixture was heated with stirring to 70° C. over a period of about 1 hour. A mixture of 5.6 parts of n-pentane and 4.4 parts of trichlorofluoromethane was added continuously over a 3-hour period while gradually raising the temperature from 70° C. to 100° C. When the blowing agent mixture was completely added, the temperature of the reaction was raised to 123° C. and maintained at that temperature for 9 hours to impregnate the pellets and to reshape the nearly spherical pellets to a mixture of flat beads having shapes varying from circular to elliptical to oval.

The kettle was then cooled down to 80° C. and 0.28 part of 91% phosphoric acid was added to neutralize the lime. A mixture of 2.5 parts of trichlorofluoromethane, 0.35 part of $\alpha,\alpha'$-bis(tert-butylperoxy) diisopropyl benzene, 2.2 parts of methanol, and 2.2 parts of tris (2,3-dibromopropyl) phosphate as self-extinguishing agent, was added and the suspension maintained at 80° C. for 10 hours to impregnate the flattened beads with the mixture. The kettle was then cooled, the beads separated by centrifugation, washed with water, and dried. The impregnation of the flat beads with the self-extinguishing agent did not change the shape of the beads. The final product was a mixture of flat disks about 1/16-inch thick and having circular, elliptical, and oval shape with a range of flatness index of about 2.0 to 6.0.

EXAMPLE II

The disks obtained in Example I were expanded in a rotary drum expander by heating with 14 psig. steam at a temperature of 95° C. at a feed rate of about 120 lbs./hour which gave partially expanded particles having a density of 1.0 lbs./cu. ft. or less. After aging the particles overnight, the particles were re-expanded in the expander at a feed rate of about 90 cu. ft./hr. to give fully expanded particles having densities of from 0.4 to 0.6 lbs./cu. ft. The particles are all extremely flat disks, about ⅛ to 3/16-inch thick, and having circular, elliptical, and oval shape with a range of flatness index of about 2.0 to 9.0. These particles are especially useful as loose-fill packaging material since their shape generally allows intimate packing of the particles. The particles were free-flowing and self-extinguishing as measured by the tests outlined earlier.

EXAMPLE III

The process of Example I was repeated except that the blowing agent mixture consisted of 6.4 parts of n-pentane and 7.8 parts of trichlorofluoromethane and the process was stopped after the reshaping of the polystyrene pellets to flat beads at 123° C. The reactor was then cooled to 40° C., dumped to separate the impregnated beads, which were then acidified with dilute hydrochloric acid solution, washed free of acid, and dried.

The impregnated beads thus obtained were a mixture of flat disks about 1/16-inch thick and having circular, elliptical, and oval shape with a range of flatness index of about 2.0 to 6.0. The beads, of course, contained no self-extinguishing agent.

On double-expansion of the disks by heating with steam as in Example II, the product was a mixture of fully expanded, flat particles having densities of from 0.6–0.7 lbs./cu.ft. The expanded particles were free-blowing, but were not self-extinguishing.

EXAMPLE IV

A series of impregnations was made in 12 oz, crown cap bottles to determine the effect of water to pellet ratio on the flatness of the pellets. The bottles were charged with the water, tricalcium phosphate (TCP), 0.05 part of sodium dodecylbenzenesulfonate (Nacconol 90F), 0.3 part of lime, 100 parts of polystyrene hot-cut pellets, 4.4 parts of trichlorofluoromethane (Freon-11), and 5.6 parts of n-pentane. The bottles were capped and heated at 123° C. for 9 hours with end-over-end tumbling agitation. The mixtures were cooled, the flattened pellets separated, washed, and tray dried. The flatness index of the pellets was measured and the average diameter/thickness noted as a measure of the efficiency of the system. The results are summarized in Table I.

Table I

| Bottle No. | 1 | 2 | 3 | 4 | 5 |
|---|---|---|---|---|---|
| Water, Parts | 150 | 125 | 100 | 125 | 100 |
| TCP, Parts | 1.5 | 1.25 | 1.0 | 1.5 | 1.5 |
| Flatness Index | 2.8 | 2.4 | >3.0 | 2.3 | 1.7 |

The pellets had less tendency to flatten when the water/pellet ratio was decreased from 150/100 to 100/100 if the amount of TCP remained constant (cf. samples 1, 4 and 5). However, the pellets had an increased tendency to flatten with decreasing water/pellet ratio if the TCP was decreased proportionately to the water (cf. samples 1, 2 and 3).

EXAMPLE V

To illustrate the effect of other variables on the flattening of the pellets, a series of impregnations was made in 12 oz. crown cap bottles by the procedure given in Example IV except that the pellet-flattening stage was carried out at 125° C. for 9 hours. The results are summarized in Table II.

TABLE II

| BOTTLE NO. | 1 | 2 | 3 | 4 | 5 | 6 | 7 | 8 | 9 | 10 | 11 |
|---|---|---|---|---|---|---|---|---|---|---|---|
| Water, Parts | 150 | 150 | 150 | 150 | 150 | 150 | 150 | 150 | 150 | 150 | 150 |
| TCP, Parts | 1.0 | 1.5 | 2.5 | 4.0 | 1.5 | 1.5 | 1.5 | 1.5 | 1.5 | 1.5 | 1.5 |
| Nacconol 90F, Parts | 0.05 | 0.05 | 0.05 | 0.05 | 0.5 | 0.05 | 0.05 | 0.0035 | 0.01 | 0.05 | 0.05 |
| Lime, Parts | 0.3 | 0.3 | 0.3 | 0.3 | — | 0.3 | 0.4 | 0.3 | 0.3 | 0.3 | 0.3 |
| Polystyrene, Parts | 100 | 100 | 100 | 100 | 100 | 100 | 100 | 100 | 100 | 100 | 100 |
| Freon II, Parts | 3.4 | 4.4 | 4.4 | 4.4 | 3.4 | 3.4 | 3.4 | 4.4 | 4.4 | — | 3.4 |
| n-Pentane, Parts | 5.6 | 5.6 | 5.6 | 5.6 | 5.6 | 5.6 | 5.6 | 5.6 | 5.6 | 5.6 | 5.6 |
| Flatness Index | >3.0 | 4.5 | 2.4 | 1.6 | 2.5 | 1.4 | 1.9 | 3.4 | 3.6 | 1.4 | 3.1 |

From the results, it appears that low amounts of TCP (cf. runs 1–4) and high amounts of Freon-11 (cf. runs 2, 10 and 11) had the most pronounced pellet flattening effects. Increasing Nacconol 90F concentration tended to flatten the pellets only slightly (cf. runs 2, 8 and 9). The lime appeared to have little effect on the flattening (cf. runs 5–7) but was found in other experiments to be a stabilizer for the second (self-extinguishing agent) stage suspensions.

What is claimed is:

1. A process for the preparation of expandable, self-extinguishing styrene polymer particles comprising:
   a. forming a suspension of 100 parts of hot cut styrene polymer pellets, 100 to 200 parts of water, 0.5 to 2.0 parts of tricalcium phosphate, 0.01 to 0.1 parts of sodium dodecylbenzenesulfonate and 0.2 to 0.4 part of lime;
   b. adding to said suspension a normally liquid organic expanding agent;
   c. heating the suspension at a temperature of 120°–130° C. for 3–10 hours to impregnate the pellets and reshape the pellets to flat disks having circular, elliptical, and oval shapes;
   d. cooling the suspension to about 75°–80° C.;
   e. adding an organic self-extinguishing agent and additional expanding agent to the impregnated disks in suspension;
   f. heating the suspension to 75°–95° C. for an additional 3 to 10 hours to impregnate the flat disks without changing their shape;
   g. cooling the suspension to room temperature; and
   h. separating the flat, impregnated disks from the aqueous phase, whereby a mixture of flat, self-extinguishing disks varying in shape from circular to oval and having a flatness index of greater than 2.0 is obtained.

2. The process of claim 1 wherein said styrene polymer is polystyrene.

3. The process of claim 1 wherein said normally liquid expanding agent is a mixture of 50–60% by weight of trichlorofluoromethane and 40–50% by weight of n-pentane.

4. The process of claim 1 wherein said organic self-extinguishing agent is tris (2,3-dibromopropyl) phosphate with a synergistic amount of an organic peroxide.

5. The process of claim 1 including the final steps of heating the flat, impregnated disks to a temperature slightly above the softening point of the styrene polymer to expand the disks to a mixture of flat, foamed particles having a density of between 0.39 and 1.00 pounds per cubic foot and a flatness index of between 2.0 and 9.0 and a generally circular to oval shape.

* * * * *